Feb. 10, 1970  E. G. ALBRECHT ET AL  3,494,251
FUZE SETTER APPARATUS
Filed Oct. 22, 1968  9 Sheets-Sheet 5

Edwin G. Albrecht
Ludolph M. Larsen
Milton C. Neuman
Charles J. Wacker
INVENTORS BY Harvey A. David
John M. Pearce
Attorneys

FIG.8

Edwin G. Albrecht
Ludolph M. Larsen
Milton C. Neuman
Charles J. Wacker
INVENTORS
Attorneys _United States Patent Office_

3,494,251
Patented Feb. 10, 1970

3,494,251
FUZE SETTER APPARATUS
Edwin G. Albrecht, Ludolph M. Larsen, and Milton C. Neuman, Minneapolis, Minn., and Charles J. Wacker, New Brighton, Mass., assignors, by mesne assignments, to the United States of America as represented by the Secretary of the Navy
Filed Oct. 22, 1968, Ser. No. 769,663
Int. Cl. F42c *17/00*
U.S. Cl. 89—6          5 Claims

ABSTRACT OF THE DISCLOSURE

A fuze setting apparatus is described comprising pawls rotated by a hydraulic drive motor through differential gear means in response to an indexing order to engage slots in the projectile and its fuze to establish a reference condition and then to effect rotation of the fuze in accordance with a fuze order provided by a two speed servo system. Also described as part of the apparatus is an electro-hydraulic mechanism for extending and retracting the fuze setter with respect to the projectile.

BACKGROUND OF THE INVENTION

This invention relates to apparatus for setting the fuzes of projectiles such as are used for example with naval guns. The fuze setting operation is, in a present system, carried out while the projectile is positioned in a transfer station just prior to being ejected therefrom into a hoist which carries the projectile to the gun loading mechanism.

An existing type of fuze setting apparatus, over which the present invention constitutes an improvement, comprises a projectile nose engaging element, referred to as a setting "pot" because of its configuration, which can be extended to bring pawls therein into engagement with the projectile nose, rotated to effect the desired fuze setting, and then retracted. The driving mechanisms for the setting pot have been very complex and included a backlash compensator, indexing motor, regulating motor, magnetic clutch, brake, and sliding spline-like gear arrangement, all operated by vacuum tube controlled systems. All of these elements have been heavy, bulky, and difficult to maintain.

SUMMARY OF THE INVENTION

With the foregoing in mind it is a principal object of the present invention to provide an improved fuze setting apparatus which is smaller, lighter in weight, and relatively free of maintenance problems.

Yet another object of the invention is the provision of a novel hydro-electrically operated fuze setting apparatus comprised of a drive motor and enclosed electro-hydraulic servo system and associated gearing for indexing the holding and setting pawls which all move as a unit to and from engagement with the projectile's fuze whereby various elements such as a specific backlash compensator, a separate regulating motor, and a separate indexing motor with its associated magnetic clutch, and sliding spline-like gear arrangement, peculiar to the earlier types have been eliminated.

DESCRIPTION OF THE PREFERRED EMBODIMENT

In the form of the invention illustrated in the drawings and described hereinafter, and with particular reference at this time to FIG. 1, there is provided a fuze setter portion, generally indicated at 10, and a fuze setter extending and retracting mechanism generally indicated at 12. Briefly, the fuze setter 10 receives fuze orders, as indicated by flow line 14, which orders are applied to synchro type control transformers, represented in FIG. 1 by block 16, and converted to error signals for application as shown by line 18 to servo amplifier means 20. The latter provide directional control signals as shown by line 22 to a servo-electro-hydraulic control valve 26 which is connected by suitable hydraulic pressure fluid lines, represented by flow line 28, to a reversible hydraulic drive motor 30.

The motor 30 is coupled by differential gearing 32 to spring loaded indexing and setting pawls 34 and 36 which are respectively adapted to engage slots in the body of a projectile 38 and in a rotatable fuze thereof and to undergo relative rotational movements in a manner described hereinafter to effect setting of the fuze in accordance with the orders received.

Figure 1:
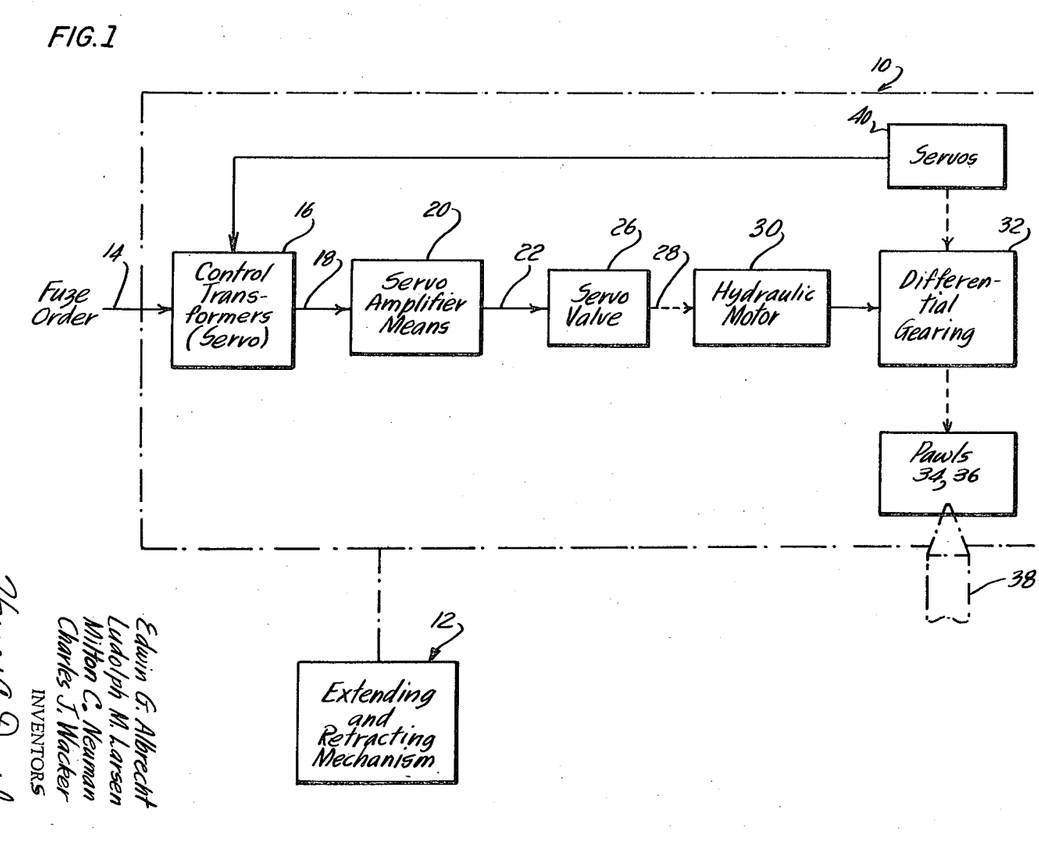
FIG. 1 is a diagrammatic view, in block form, of a fuze setting apparatus embodying the present invention.

The movements of the various gears of the differential gearing 32, hence of the pawls 34 and 36, are sensed by suitable synchro means, represented collectively in FIG. 1 at 40, which provide response signals as shown by flow line 42 to the transformer means 16 at the servo amplifier. When the error signals are reduced to an acceptable level, the fuze has been set. The fuze setter 10 is extended or retracted to and from a projectile 38 as a unit by the fuze setter extending and retracting mechanism 12 which constitutes an electrically controlled hydraulic device which will be described in more detail as this specification proceeds.

Figure 2:
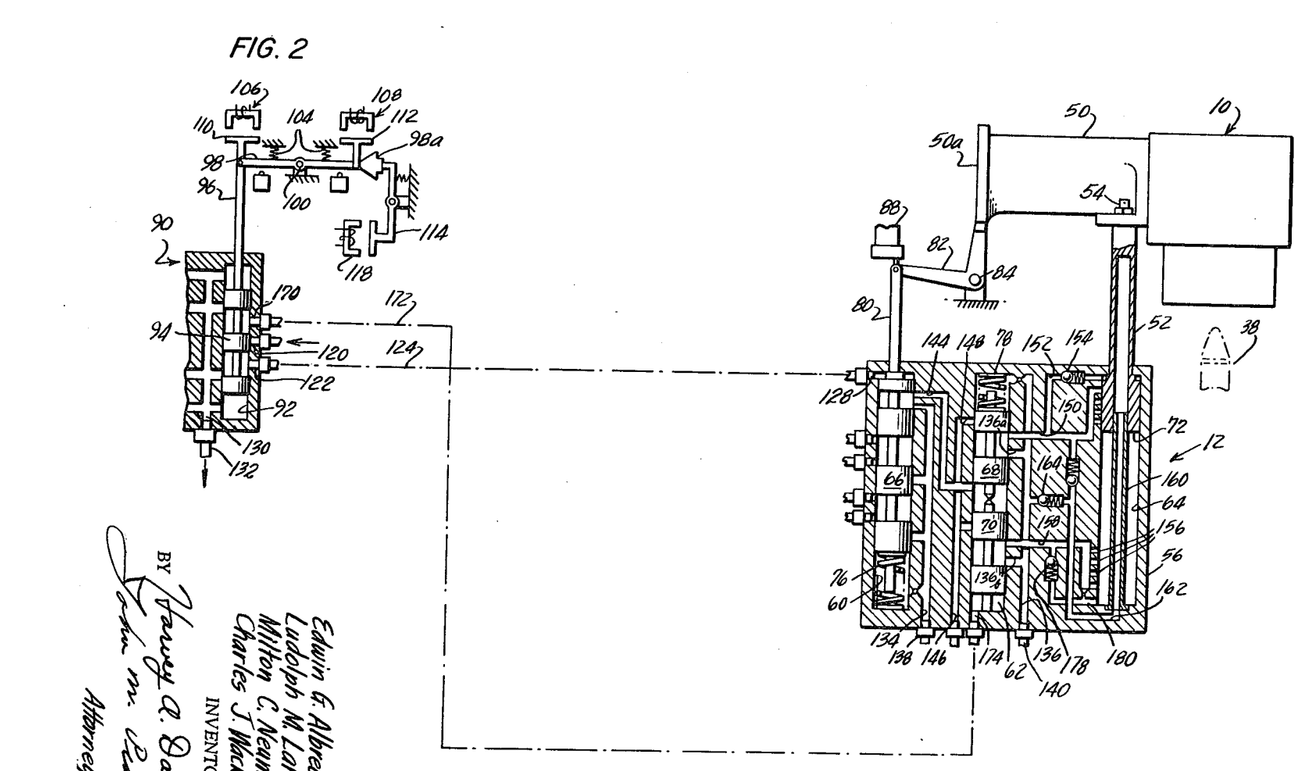
FIG. 2 is a detailed schematic illustration of the extending and retracting mechanism of the apparatus of FIG. 1.

Referring more particularly now to FIG. 2, the fuze setter 10 comprises a housing 50 which is movable vertically along suitable guides (not shown) by a piston rod 52 extending from the advancing and retracting mechanism 12 and secured to the setter 10 as by screw and nut means 54. The advancing and retracting mechanism 12 is mounted adjacent the transfer station and comprises a body 56 which may be an assembly of several pieces but is conveniently shown as comprised of a single piece. The body 56 includes a plurality of cylindrical bores 60, 62, and 64, the bore 60 accommodating a spool type hydraulic valve member 66, the bore 62 accommodating upper and lower spool type valve members 68 and 70, and the bore 64 accommodating a differential piston 72 connected to the piston rod 52.

The valve member 66, which has four lands and serves as a latch valve, a sequence valve, and an interlock valve, is biased toward a normal upward position by a spring 76. The valve members 68 and 70, each of which has two lands, are biased toward normal downward positions by a spring 78. The valve member 66 has its upper end connected by a linkage 80 to a bell crank 82 having its pivot 84 mounted on suitable stationary means. The bell crank 82 serves to engage a portion of the setter 10 and lock it in its elevated or retracted position when the valve member 66 is in its normal upper position. The bell crank 82 also actuates a switch 88 when the valve member 66 is in its normal position.

Operation of the valve member 66 to unlock the setter 10 for extension toward a projectile 38, and operation of the valve members 68 and 70 to control operation of the piston 72 to effect extension or retraction of the setter, are under the control of a solenoid operated valve, generally indicated at 90 in FIG. 2. The valve 90 includes a bore 92 accommodating a spool type hydraulic valve member 94 which has its upper end connected by a linkage 96 to one end of a lever 98 which is centrally pivoted at 100. The lever 98, and the valve member 94 are biased toward their respectively illustrated neutral positions by springs 104 acting on the lever. The valve member 94 is movable in one direction or the other from its neutral position by solenoids 106 and 108 acting respectively on armatures 110 and 112 connected to opposite ends of the lever 98, the movements of the valve member 98 controlling extension or retraction of the setter 10 in a manner which will become apparent as this description proceeds.

The end of the lever 98 opposite the linkage 96 carries a latch plate 98a which is adapted to cooperate with a latch 114 under the bias of spring 116 to retain the valve member 94 in either an up or a down position until energization of an unlatching solenoid 118. Upon energization of the solenoid 106 in response to appropriate conditions such as presence of a projectile at the transfer station, the valve member 94 is moved upwardly and is detented by latch 114, thereby permitting pressure fluid applied to port 120 from a suitable source to be ported to an outlet port 122. The port 122 is connected by suitable conduit or tubing 124 to an inlet port 128 of block 56, thereby forcing the valve member 66 downwardly against the action of spring 76.

The valve 90 is provided with drain passages communicating with a drain port 130 which is connected by a return line 132 to a hydraulic pressure fluid supply tank (not shown). Similarly the mechanism 12 is provided with drain passages from the bore 60 communicating with a drain port 134, and drain passages from the bore 62 communicating with a drain port 136. The drain ports 134 and 136 are connected by return lines 138, 140 with the mentioned supply tank.

Downward movement of the valve member 66 actuates the bell crank 82 to unlatch the setter 10 and also permits pressure fluid applied to the inlet port 128 to be ported via a passage 144 to the portion of bore 62 between the valve members 68 and 70 which are directional control valves for the piston 72. The pressure fluid so ported to bore 62 causes the valve member 68 to rise against the action of spring 78 and to pass pressure fluid which is applied to an inlet port 146 and passage 148 to a passage 150 having a branch 152 including a check valve 154. The fluid opens the check valve 154 and enters bore 64 above the piston 72, thereby causing the setter 10 to be extended toward a projectile 38. Fluid is expelled from the bore 64 by the advancing piston via deceleration ports 156, passage 158, bore 62, and drain port 136.

The piston 72 and piston rod 52 are hollow and telescopingly receive a tube or spud 160 secured to the block 56 at the bottom of the bore 64. Fluid is expelled from the tube 160 during advance of the piston 72 via a passage 162 and a check valve therein to the pressure passage 150. Fluid is also expelled by the piston 72 through deceleration ports 156 and passages 180, 158, and 136 to the return line 140.

As the piston approaches the bottom end of the bore 64 it progressively covers the deceleration ports 156 and is thereby gradually decelerated to a halt with the setter 10 in engagement with a projectile 38. Setting of the projectile fuze is then effected by the setter 10, the construction and operation of which will be later described in detail. Upon completion of the setting function, a "fuze set" signal is generated and the solenoid 118 is energized to undetent or unlatch the valve member 94 in readiness for the retract cycle. This results in movement of the valve member 94 to its neutral position wherein the port 122 communicates, through the bore 92 and associated drain passages, with drain port 130, whereupon the spring 76 in mechanism 12 tends to return valve member 66 to its upper position. The valve member 66 is, however, held down by the bell crank 82 which rides against the surface 50a of housing 50 while the setter 10 is in extended condition.

When conditions, such as need at the mount for ammunition, availability of the hoist, and the like are satisfied, the solenoid 108 is energized causing the lever 98 and linkage 96 to move the valve member 94 downwardly from its illustrated neutral position. This movement of the valve member 94 ports hydraulic pressure fluid from inlet port 120 to an outlet port 170 which is connected by suitable tubing 172 to an inlet port 174 in the block 56 of the mechanism 12.

This fluid causes both of the valve members 68 and 70 in bore 62 to rise against the action of spring 78 whereupon drain passages 136a and 136b are closed and inlet port 146 is ported into communication with passages 150 and 158. Because the effective area on the underside of piston 72 exceeds the effective area on the upperside thereof, pressure fluid in passage 158 passes a check valve 178, follows a passage 180, and causes the piston 72 to rise in the bore 64. The rising piston 72 and associated connecting rod 52 retract the setter 10 from the projectile 38 until it comes to rest in its illustrated position whereupon the bell crank 82 latches it there under the influence of the spring 76.

Figure 3A:
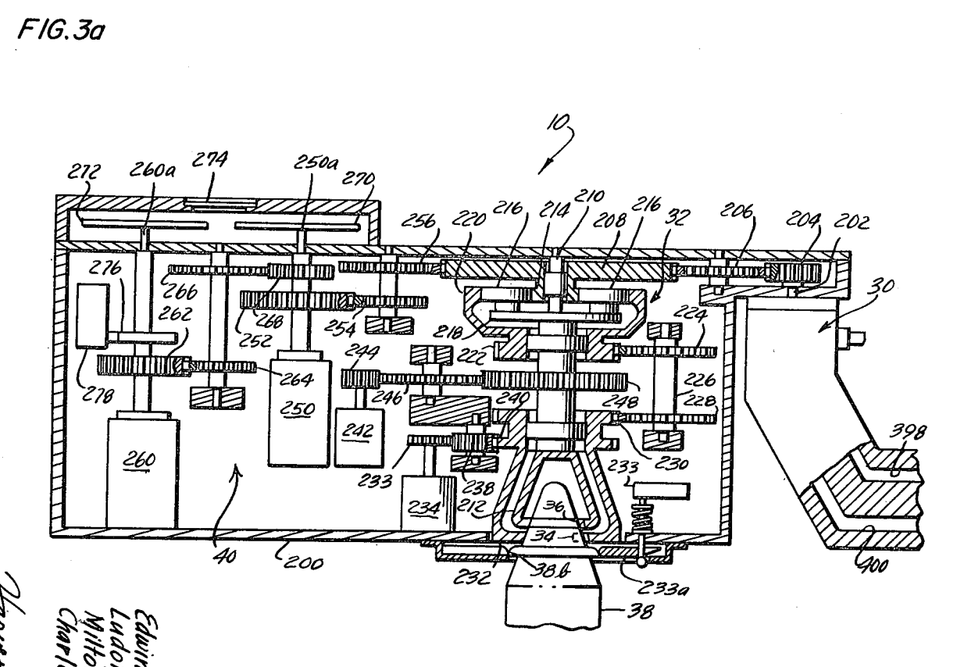
FIG. 3 is a detailed schematic illustration of the fuze setter portion of the apparatus of FIG. 1.
Figure 3B:
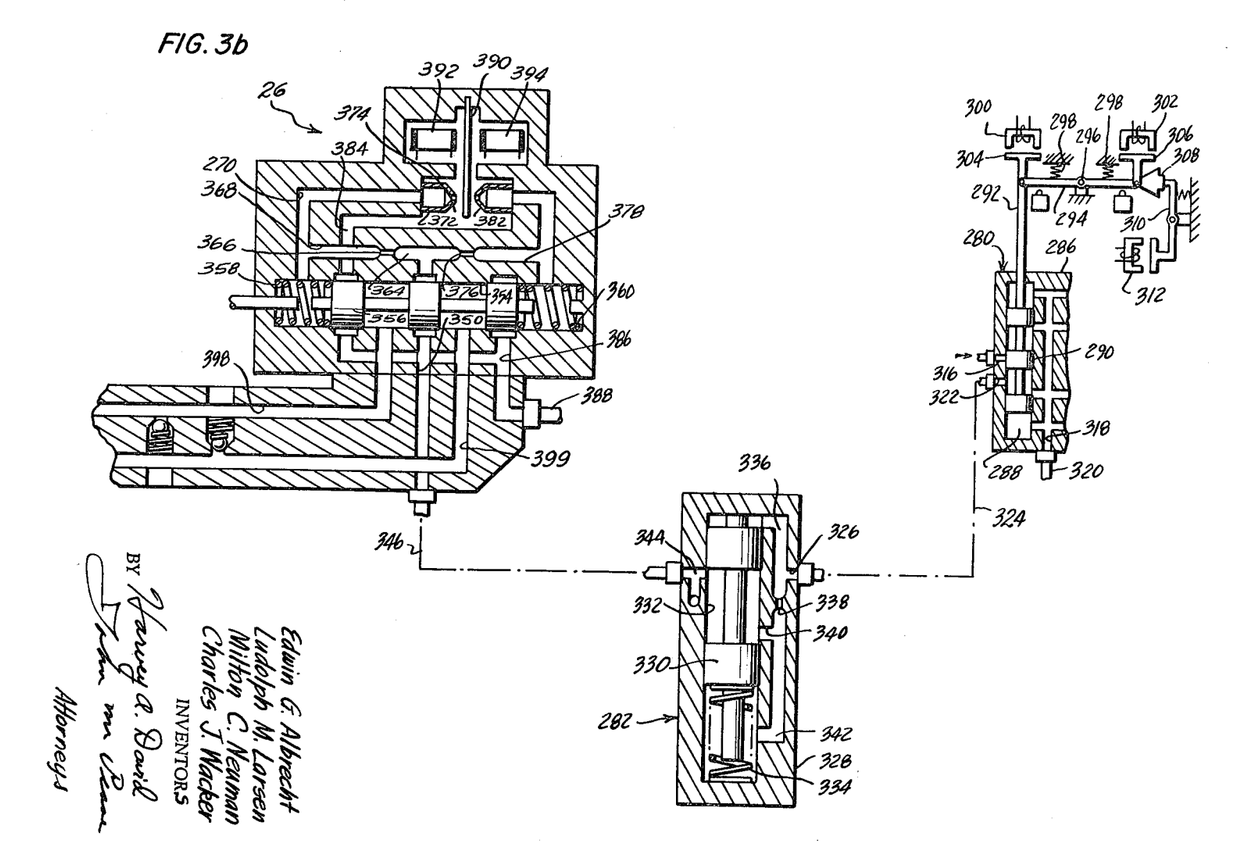

Referring now to FIG. 3, the fuze setter 10 comprises a housing 200 in which the differential gearing 32, the synchro and tachometer means 40, and the indexing setting pawls 34 and 36 are housed. Fixed to one end of the housing 200 is the reversible force motor 30 having an output shaft 202 extending into the housing and carrying a drive pinion 204. The pinion 204 is in meshing engagement with an intermediate gear 206 which is in turn in meshing engagement with a gear 208. The gear 208 is rotatably journalled on a central shaft 210 of the differential gearing 32 which is conveniently of the planetary type. The shaft 210 is journalled in the housing 200 and carries at its lower end an annulus 212 which carries the setting pawl 36.

The gear 208 has formed integrally therewith a sun gear 214 which is in meshing engagement with a plurality of planet gears 216, the axes of which are mounted on a spider 218 secured to the shaft 210. The planet gears 216 mesh with a ring gear 220 which is rotatably journaled on the shaft 210 and has a gear 222 formed integrally therewith.

The gear 222 is in meshing engagement with a gear 224 secured to a lay shaft 226 which is journaled in the housing 200 and has secured thereon a gear 228. The gear 228 is in meshing engagement with a gear 230 which is formed integrally with an annulus 232 journaled for rotation on shaft 210 and carrying the indexing pawl 34. The indexing and setting pawls 34 and 36, best illustrated in FIG. 3, are biased radially inwardly by springs (not shown) for engagement with a slot in the projectile 38 and a setting ring 38a for indexing and setting thereof as will later be more fully explained. Mounted adjacent the setting is a switch 233 and its actuator 233a which is movable by engagement with an adapter ring 38b on the projectile when the setter 10 has been extended into position on the nose of the projectile.

It will be recognized that when the motor 30 turns the drive pinion 204 the just described differential gearing 32 will result in rotation of whichever one of the pawls 34, 36, that meets the least resistance to rotation. Also, it will be recognized that for a given direction of rotation of the motor 30, rotation of the indexing pawl 34, if it occurs, will be in a direction opposite to rotation of the setting pawl 36, if it occurs.

Rotational movements of the pawls are sensed by the synchro and tachometer means 40. Thus, individual rotation of the indexing pawl 34 is sensed by a synchro unit 234 which is coupled by gears 236, 238, and 240 to the annulus 232. Individual rotation of the setting pawl 36 is sensed by a synchro unit 242 which is coupled by gears 244, 246, and 248 to the shaft carrying the annulus 212.

Composite rotations of the pawls are sensed by a tachometer unit 250, the shaft 250a of which is coupled to the motor 20 by gears 252, 254, 256, 208, 206, and 204, and also by a synchro unit 260, the shaft 260a of which is coupled to the tachometer by gears 262, 264, 266, and 268. The shafts 250a and 260a carry indicator dials 270 and 272, respectively, which are viewable through a port 274 in the housing 200. In addition, the shaft 260a carries a cam 276 which is settable to actuate a switch 278 whenever the fuze setting is less than some predetermined minimum time such as five seconds. The switch 278 prevents occurrence of a "fuze set" signal unless the time set is greater than the minimum determined by the cam 276.

The motor 30 is controlled in its running by a solenoid operated pilot valve 280, a speed controlling metering valve 282, and the servo valve 26 which is a solenoid operated directional control valve. The pilot valve 280 is similar to the valve 90 and comprises a body 286 having a bore 288 accommodating a three land valve member 290. The valve member 290 is connected by a linkage 292 to one end of a lever 294 which is centrally pivoted at 296.

The lever 294 and the valve member 290 are normally held in a neutral position, as illustrated, by springs 298. Solenoids 300 and 302 are provided which may be selectively energized to act on respective armatures 304 and 306 connected to lever 294 to move the valve member into upward or downward positions. A latch plate 308 is provided at the end of the lever 290 remote from the linkage 292 and cooperates with a spring biased latch member 310 to detent the valve in either of its upward or downward positions. An unlatching solenoid 312 is energizeable to release the valve member for movement to its neutral position.

The valve 280 is connected to receive hydraulic pressure fluid at an inlet port 316 which is normally closed by the middle land of the valve member 290. The bore 288 communicates via drain passages with a drain port 318 connected by a return line 320 to the supply tank.

Energization of the solenoid 300 in response to conditions including actuation of switch 233 will effect movement of the valve member 290 to its upward position, thereby porting pressure fluid from inlet port 316 to an outlet port 322 connected by tubing 324 to an inlet port 326 in the body 328 of the speed regulating valve 282.

The valve 282 is a conventional metering valve construction including a two land valve member 330 reciprocably disposed in a bore 332 and biased upwardly therein by a spring 334. The inlet port 326 communicates with the upper part of the bore 332, above the upper land of the valve member, by a passage 336, and with the middle and lower parts of the bore via a restricting orifice 338 and passages 340 and 342. A variable orifice outlet port communicates with the bore 332 between the lands of the valve member 330 and is variably restricted by the upper land in response to changes in pressure differential existing across the valve member 330 to maintain a substantially constant rate of flow from the outlet port 344 into tubing 346.

The tubing 346 is connected to provide hydraulic fluid flow to an inlet passage 350 in the valve body 352 of the directional control servo valve 26. The body 352 comprises a bore 354 in which there is disposed a three land valve member 356, normally held in a centered position by springs 358 and 360 acting on the ends thereof. Fluid entering the passage 350 is normally blocked from entering the bore 354 by the middle land of the valve member 356, but flows via an undercut thereabout to a dividing passage 364. From passage 364 pressure fluid flows in one direction through a restriction 366, passages 368, 370, and a nozzle 372 to the chamber 374. The chamber 374 is connected by a passage 384, which includes an undercut around the left hand land of the valve member 356, to a drain passage 386 which is connected to suitable conduit 388 means for return to the supply tank.

The nozzles 372 and 382 are adapted to be restricted or closed by a flexible vane 390 which is disposed between two solenoids or force coils 392 and 394. The coils are electrically connected in parallel and are adapted to be energized with D.C. current of one sense of polarity or the other. When the coils are in a de-energized state, the vane will be in its centered position as illustrated. Energization of the coils 392 and 394 with current of one polarity or the other will cause the vane to close one or the other of the nozzles and effect an increase in fluid pressure in the corresponding passage 370 or 380 which will shift the valve member to the right or left, respectively.

Shifting of the valve member 356 to the right will port pressure fluid from passage 350 to one motor supply passage 398 and will port motor exhaust fluid from another motor supply passage 399 to the drain passage 386, resulting in operation of the motor in a first direction. Shifting of the valve member 356 to the left will port pressure fluid from passage 350 to the other motor supply passage 399 and will port motor exhaust fluid from the passage 398 to the drain passage 386, resulting in operation of the motor in the opposite direction. Such changes in motor direction occur in accordance with changes in fuze order from increasing to decreasing or decreasing to increasing.

Energization of the coils 392 and 394 to effect indexing of the projectile and setting of the fuze is accomplished by circuitry referred to as the fuze setter amplifier which converts and amplifies A.C. synchro error signals from the synchros 234, 242, 260, to a D.C. signal large enough and of proper polarity to activate the servo valve 26. The fuze setter amplifier, which is depicted in simplified form in FIG. 4, comprises for convenience three plug-in circuit cards. These include an attenuation and relay circuits card 400, and output amplifier card 402, and an indexing circuits and power supplies card 404.

Figures 4, 9:
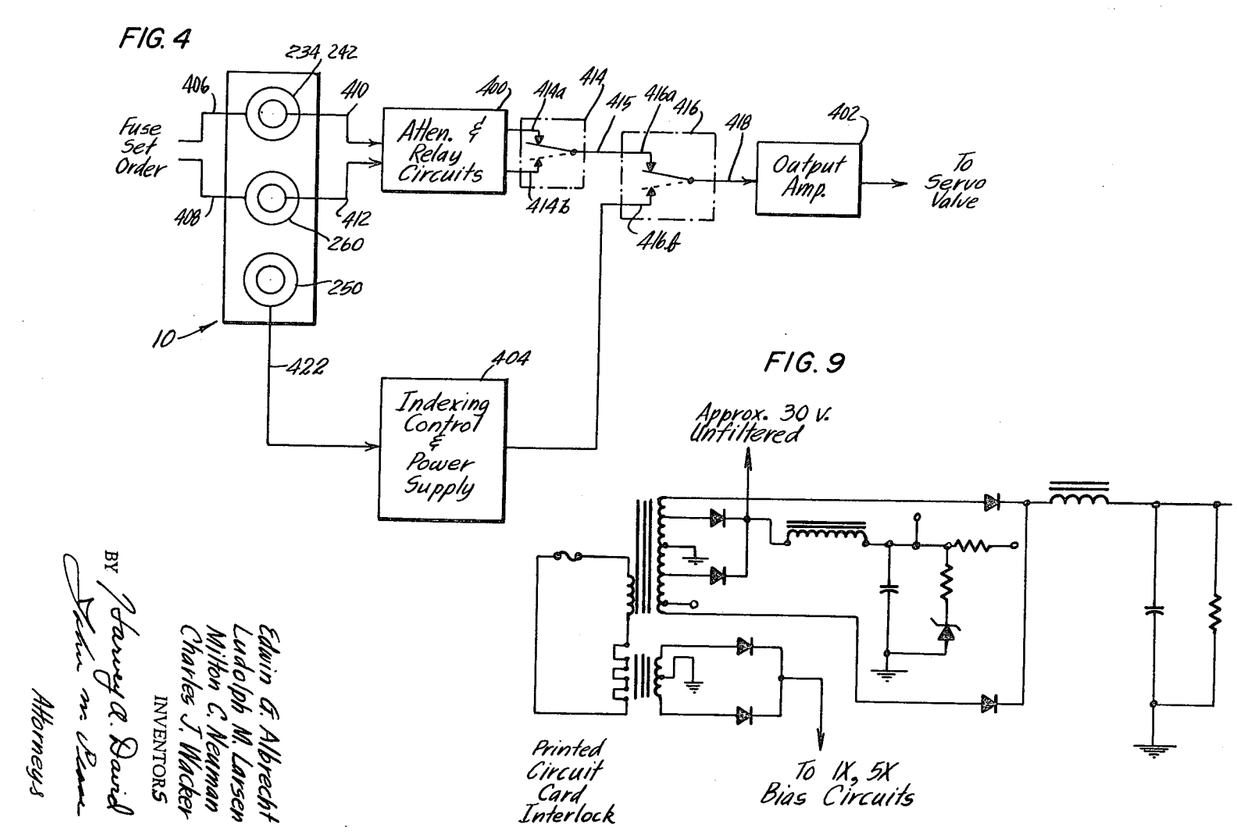
FIG. 4 is a block diagram functionally illustrating the circuit means for shifting of servo speeds and for shifting control from the indexing order to the fuze order.
FIG. 9 is a schematic illustration of a power supply circuit.

The fuze order signal, coming from the fire control station as shown by lines 406, 408, is applied to the 1-speed (1×) synchro 260 and to the 5-speed (5×) synchros 234 and 242. The output of these synchros constitutes the fuze error signal which is applied as shown by lines 410, 412 to the attenuation and relay circuits card 400. When the fuze setting is greater than four degrees of the desired setting, the output of card 400 is through the 1× contacts 414b of the relay 414. This is represented by the dotted line position of that relay. When the fuze setting is within four degrees (.57 fuze second) of the desired setting, the output of card 400 is through the 5× contacts 414a of a relay 414. This is represented by the full line position of that relay. The use of a two speed synchro system allows for finer control of the fuze setting operation.

The 1× or 5× fuze error is applied via line 415 to fuze order contacts 416a of a relay 416 forming part of the card 404. The other contacts 416b of card 404 receive a 400 cycle index order signal from a suitable power supply connected to card 404.

When the relay 416 is in the dotted line position, an indexing order signal from the card 404 is applied to the output amplifier card 402. The indexing order is amplified and rectified in the output amplifier card 402 to operate the force coils in the servo valve 26. The drive motor 30 will cause the pawls to turn, as described more fully hereinafter, until they have properly engaged and completed two and one-twelfth relative turns. The tachometer 250 senses and turns and applies its output, as shown via line 422, to the card 404. The card 404 converts the tachometer output to produce a voltage corresponding to the required two and one twelfth relative turns. When the required rotation has been satisfied, the integrated tachometer output voltage produces an "indexing complete" signal which shifts the relay 416 to the full line position, thereby connecting the fuze error signal on line 415 to the output amplifier card 402. The 1× or 5× fuze error is there amplified and rectified to operate the force coils in servo valve 26 so that rotation of the pawls continues in the appropriate direction until the desired fuze setting is achieved.

Figure 5:
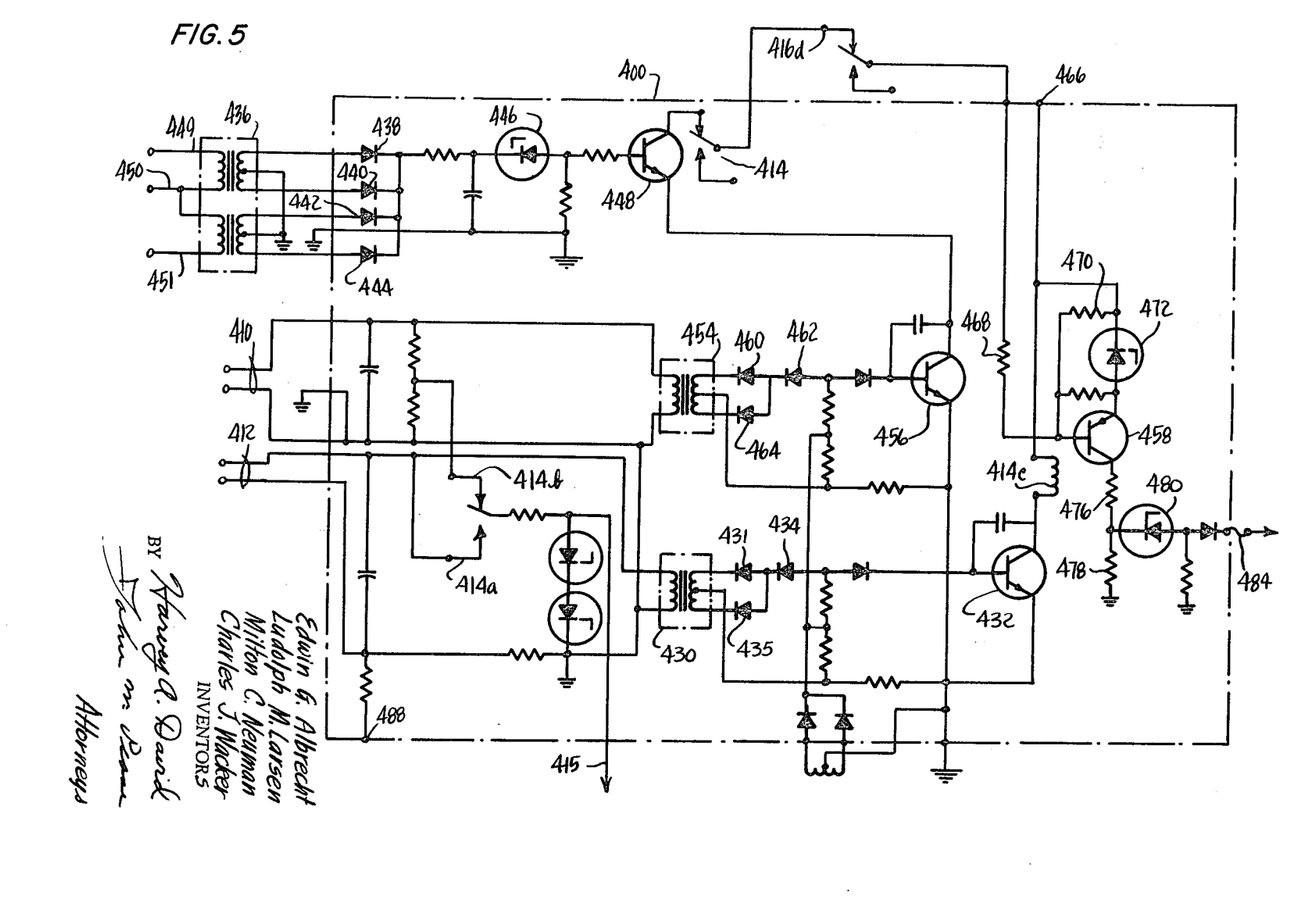
FIG. 5 is a detailed schematic illustration of relay circuitry forming part of the circuit means of FIG. 4.

Referring to FIG. 5, there are illustrated details of the circuitry of the card 400. This card has three functions. It will: (1) perform the just mentioned switching between 1× and 5× control, (2) monitor the stators of the 1× synchro, and (3) give the "fuze set" indication when the error signal is less than 1°3′.

The switching control function (between 1× and 5× control) is achieved by a circuit including a transformer 430, a transistor 432, and the relay 414. The 1× signal applied to transformer 430 is rectified by diodes 431, 434, 435, and the negative voltage developed is used to bias the transistor 432. As long as the input error is greater than four degrees (.57 fuze second), transistor 432 remains cut off and the solenoid 414c of relay 414 remains de-energized. This allows the 1× fuze order to pass through the normally closed contacts 414 of the relay and be applied to the output amplifier of card 402.

When the error signal is less than four degrees, the negative bias on transistor 432 is not sufficient to maintain it at cut off. Hence, the transistor conducts, energizing relay 414 so as to disconnect the 1× fuze order from the output amplifier of card 402 and connect the 5× fuze order thereto.

Figure 6:
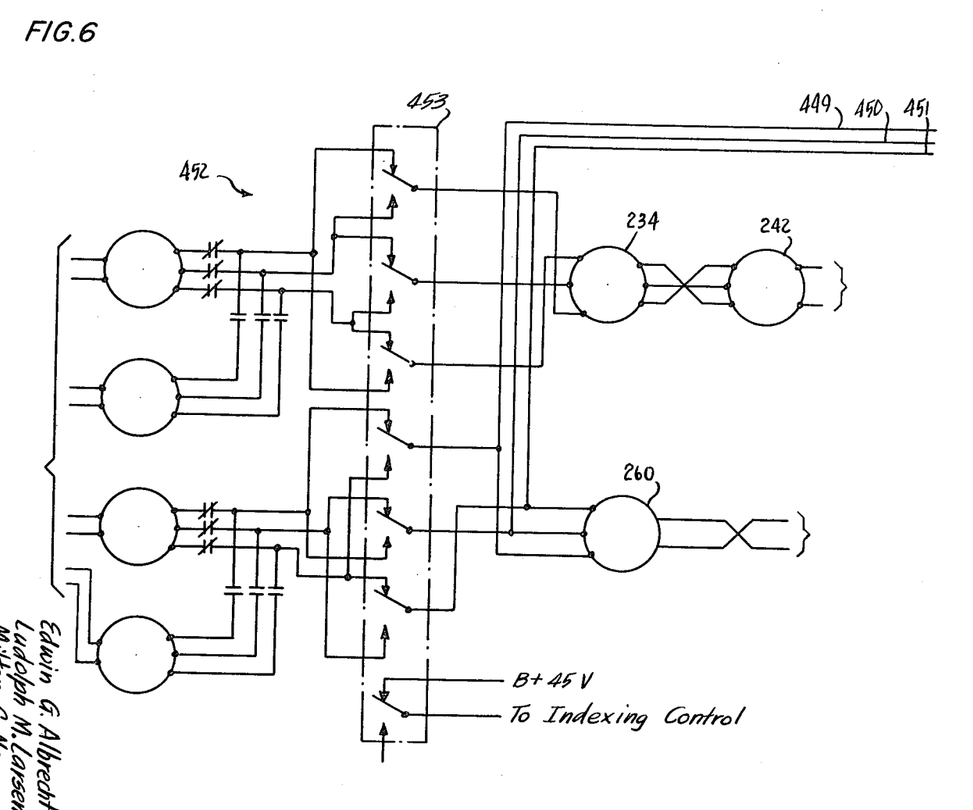
FIG. 6 is a schematic illustration of a servo switching matrix.

The synchro monitor function of card 400 is accomplished by transformer 436, a rectifier circuit including diodes 438, 440, 442, 444, a breakdown diode 446, and a transistor 448. This circuit monitors the stators of the 1× synchro 260. Under normal operating conditions, the signal applied to transformer 436 via lines 449, 450, 451 from the switching matrix 452 illustrated in FIG. 6 is rectified, and the resulting positive voltage is used to forward bias (and prime) the transistor 448. (This transistor plays a part in the "fuze set" indicator circuit to be described below.)

In FIG. 6, stator connections of the various synchro units are indicated as S1, S2, S3, and rotor connections are indicated as R1 and R2. The matrix 452 comprises a relay 453, which is energized when switch 233 is closed by engagement of the fuze setter 10 with the projectile 38. The relay 453 is illustrated in its energized (projectile engaged) condition. The purpose of the relay 453 is to reverse connections to the synchros to provide a displacement of the pawls upon retraction of the fuze setter after the indexing and setting, later to be described more fully.

If any of the stators of the 1× synchros should open or short circuit, the rectified output voltage will not be sufficient to forward bias the base of transistor 448, and if it is conducting at the time of such a short or open, the transistor will then cut off. As long as all 1× stators and their leads are in a normal condition and an error signal is applied, the base of transistor 448 is biased properly.

The circuit of card 400 which performs the fuze set indication function comprises transformer 454, transistors 448, 456, 458, and relays 414 and 416. The 5× synchro error signal applied to transformer 454 is rectified by diodes 460, 462, 464 and the negative voltage developed is used to bias transistor 456 such that as long as the input signal is greater than 1°3′, sufficient bias is developed to keep that transistor cut off.

When the error signal is less than 1°3′, the fuze is considered to be set. At such time, transistor 456 conducts and completes a path to ground for the emitter circuit of transistor 448. The collector of transistor 448 is returned to B-plus through relay contacts 414d and 416d, and resistors 468, 470. As transistor 448 conducts, the voltage drop across resistor 470 forward biases the base of transistor 458, diode 472 breaks down permitting this transistor to conduct. The fuze set indication is taken from between collector resistors 476, 478, via diodes 480, 482, and line 484. This signal is utilized to initiate the retract cycle.

To prevent the synchros from positioning to a false null setting, a 3.6 volt, 400 cycle signal is added at terminal 488 to the 1× synchro input to the card 400 as an offset voltage. This offset voltage signal shifts the 0° point null of the 1× syncho forward by 3.6°, and the 180° point null back by 3.6°. The 1× synchro is re-zeroed which moves the null points another 3.6°. The null is therefore displaced a total of 7.2° and changeovers between the 1× and the 5× synchros takes place at either 3.2° or 11.2° (7.2°±4°) from the 180° point.

Figure 7:
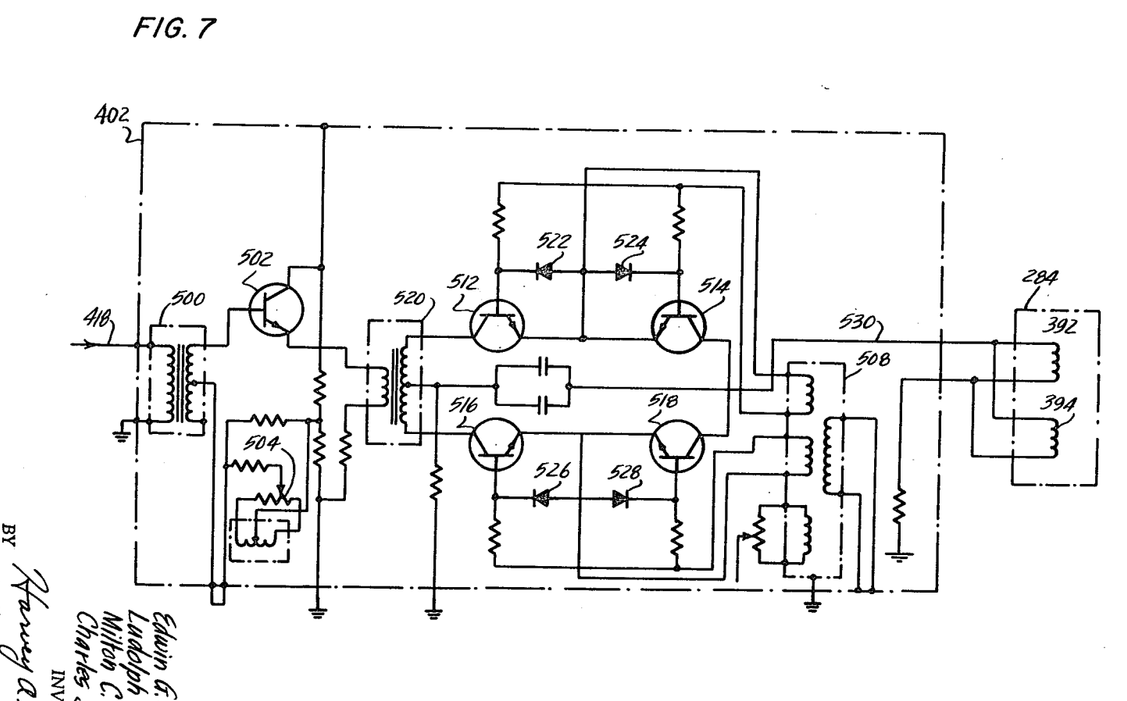
FIG. 7 is a schematic illustration of the output amplifier portion of the circuit means of FIG. 4.

Referring now to FIG. 7, illustrating the circuitry of the output amplifier card 402, this consists of a driver stage and a demodulator (rectifier) stage. As noted earlier, it amplifies and rectifies the input signal and applies the resultant D.C. voltage to the force motor coils 392, 394 of the servo valve 26.

In the driver stage, the input signal, which is either the indexing order or the fuze order, arrives via line 418 to a transformer 500 and is applied therethrough to a transistor 502. Transistor 502 is connected in emitter follower configuration and serves primarily as a buffer amplifier and impedance matching stage. A stroke balance potentiometer 504 compensates for any unbalance in the system external to the amplifier by placing a small 400 cycle signal in series with the input voltage. This small voltage is derived from a transformer winding 506 forming part of a transformer 508. Turning the shaft of potentiometer 504 to one side or the other introduces an in phase or out of phase signal. Thus, it is possible to modify the synchro signal to correct for residual system error.

The demodulator circuit comprises transistors 512, 514, 516, and 518, to which the error signal output of transistor 502 is coupled by a transformer 520, and diodes 522, 524, 526, and 528. The transistors 512 and 514 and the transistors 516 and 518 are alternatively made conductive in accordance with whether the fuze order is increasing or decreasing, and a D.C. potential of corresponding polarity is provided on output line 530 connected to the coils 392, 394. Hence the coils 392, 394 will contain a D.C. current proportional to the magnitude of the error signal of one polarity when the fuze order is increasing and of a different polarity when the fuze order is decreasing.

Figure 8:
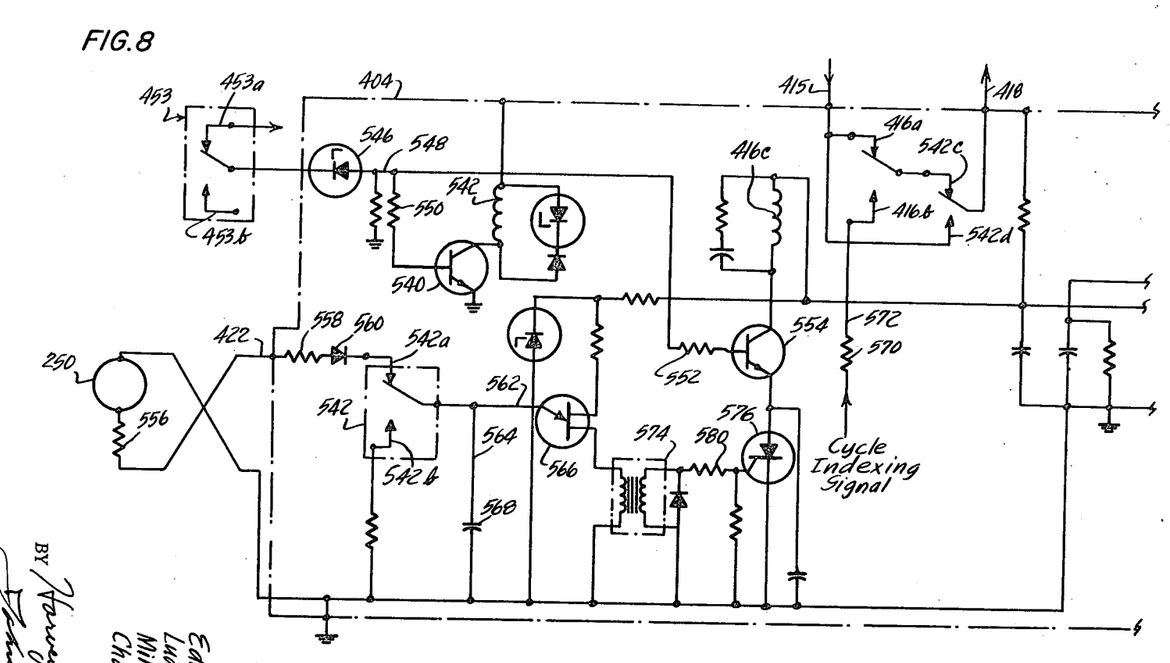
FIG. 8 is a schematic illustration of the indexing control portion of the circuit means of FIG. 4.

Referring now to FIG. 8, illustrating the circuitry of the indexing control card 404, this includes a ready circuit, an indexing circuit, and an indexing complete circuit. Additionally, the card 404 may include the power supply circuitry for the various synchros and relays, this being illustrated separately in FIG. 9.

Reverting to FIG. 8, the circuitry of card 404 (1) indicates when the fuze setter 10 has engaged the projectile 38 and the amplifier is ready, (2) switches the indexing signal to the output amplifier card 402 for effecting the indexing, (3) starts the indexing cycle, (4) indicates when indexing is complete, and (5) switches the synchro signal to the output amplifier upon the completion of indexing.

The ready circuit consists of a portion of relay 453, a transistor 540, and a relay 542 having a pair of contacts 542a, 542b, a pair of contacts 542c, 542d, and a solenoid 542e. This circuit switches the indexing signal to the output amplifier at the start of the indexing cycle. To accomplish this, when the fuze setter 10 is extended, the pawls 34, 36 are engaged and the amplifier is ready, the relay 453 is energized making contact 453a thereof effective to apply bias voltage via diode 546, line 548, and resistors 550 and 552 to the bases of transistors 540 and 554, respectively. Only transistor 540 will conduct at this time, however, because the emitter circuit of transistor 554 is open circuited.

When transistor 540 conducts, solenoid 542e is energized and relay 542 completes a circuit path which may be traced from the tachometer 250 through a resistor 556, line 422, resistor 558, diode 560, relay contact 542a, and lines 562 and 564 to a unijunction transistor 566 and to a capacitor 568, respectively. Because the solenoid 416c of relay 416 is at this time de-energized, the 400 cycle indexing signal voltage from a suitable power supply (not shown) is applied via resistor 570, line 572, relay contacts 416b, 542c, and line 418 to the output amplifier of card 402. The pawls now go through their indexing cycle as will be described more fully as this specification proceeds. The circuit applies a maximum velocity signal to the output amplifier until an indexing complete circuit actuates relay 416 to disconnect the indexing signal from the output amplifier.

The indexing complete circuit includes the tachometer 250, transistor 566, a pulse transformer 574, transistor 554, controlled rectifier 576, and relay 416. The tachometer 250, which is driven through the previously described gearing by motor 30, begins to charge the capacitor 568 as the tachometer rotates. The tachometer generates a velocity voltage. That is, the voltage generated will be proportional to the velocity of tachometer rotation. This voltage charges capacitor 568 through resistors 556, 558, and diode 560. The rate of which the capacitor charges is a function of the rate of rotation of the tachometer and thus the charge on the capacitor is a measure of pawl rotation.

When the pawls have made two and one-twelfth relative turns, the capacitor will have been charged to a predetermined voltage at which the unijunction transistor 566 becomes forward biased and conducts. The positive pulse that appears across the secondary of transformer 574 is applied via resistor 580 to the gate of the silicon-controlled rectifier 576. When the controlled rectifier 576 receives an impulse at its gate, it fires, completing the path to ground for the emitter of transistor 554, allowing that transistor to conduct and energize relay 416.

Contact 416b is thereby opened interrupting the indexing signal to the output amplifier and terminating the indexing cycle, and contact 416a is closed, as illustrated in FIG. 8, so as to connect the synchro signal to the output amplifier. As described earlier, the synchro signal is converted by the output of the amplifier into rotation of the motor 30 in one direction or the other as the fuze order increases or decreases.

In the operation of the fuze setting apparatus 10, there is no way of knowing where the slots of the projectile may be in relation to the pawls 34, 36, so there is no reference from which to start setting the fuze. As each round is placed in the transfer station, the relative position of the slots and pawls change. At one time the pawls may just happen to engage the slots when the fuze setter is extended and at another time it may require a full turn clockwise by the holding pawl and a full turn counterclockwise by the setting pawl before engagement. Indexing assures both a reference point and positive engagement of the pawls in the slots.

As described earlier, the pawls are rotated through the differential gearing 32, and as a result of the gearing the direction of rotation of the pawls is fixed during and after the indexing cycle. During the indexing cycle the setting pawl rotates CCW and the holding pawl rotates CW. When indexing is complete, the holding pawl does not move but the setting pawl (and the fuze) can be rotated in either direction.

Which pawl turns first is a function of the internal friction of the unit. When the fuze setter is retracted, the pawl with the least resistance will turn in response to the fuze order signal. When the fuze setter is extended, and before either pawl is engaged, the pawl with the least resistance will turn until it engages its slot, and then stops. If the holding pawl turns first (CW) it will stop when it engages the holding slot. Motion is then transferred (through the differential gearing) to the setting pawl and it will rotate CCW to complete the indexing cycle. If the setting pawl rotates first (CCW) it will stop when it engages the setting slot (due to projectile fuze torque). Motion is then transferred to the holding pawl which rotates (CW) until it engages its slot and stops. Motion is again transferred to the setting pawl, overcoming fuze torque, and it rotates the fuze (CCW) to complete the indexing cycle.

From the foregoing detailed description, it will be appreciated that the described fuze setting apparatus embodying the invention satisfies the previously stated objects and advantages, as well as others apparent from the description.

What is claimed is:

1. Apparatus for rotatively setting projectile fuzes in accordance with fuze order signals, said apparatus including a fuze setter portion comprising:
a housing;
a drive motor mounted on said housing;
first and second annular members mounted in said housing for rotation about a common central axis and adapted to receive the nose portion of a projectile;
an indexing pawl carried by said first annular member and adapted to engage a slot in the body of a projectile having a rotatable fuze portion;
a setting pawl carried by said second annular member and adapted to engage a slot in the fuze portion of said projectile;
differential gear means mounted in said housing, and coupling said drive motor to said first and second annular members whereby rotation of said motor will result in rotation of which ever of said pawls meets the least resistance, rotation of said pawls being in opposite direcitons;
a source of an electrical indexing signal;
servo means mechanically coupled to said gearing and responsive to said fuze order signals to provide fuze error signals;
tachometer means mechanically coupled to said gearing and operative to provide an output voltage which is a function of rate of turning of said pawls;
output amplifier means connected to effect operation of said motor in one direction of the other in response to an input to said output amplifier means;
relay circuit means including relay means operative in a first condition to couple said index signal as an input to said output amplifier means, and operative in a second condition to couple said fuze order signals as an input to said output amplifier means; said relay circuit means being responsive to predetermined rotation of said tachometer means to shift said relay means from said first condition to said second condition;
an extending and retracting mechanism for said fuze setter portion, said mechanism comprising valve body means defining first, second, and third bores;
a piston reciprocable in said first bore;
a piston rod connected to said piston for movement therewith and extending from said block means, said piston rod being connected to said housing to effect extension and retraction of said fuze setter portion when said piston undergoes movements in one direction or the other;

a pair of spool type direction controlling valve members reciprocable in said second bore;

a spool type valve member reciprocable in said third bore; and passageways defined in said valve body means between said bores and cooperable with said valve members to direct pressure fluid to one side or the other of said piston and effect said movements thereof.

2. Apparatus as defined in claim 1 and wherein:

said servo means comprises a two-speed servo system providing first and second speed error signals;

said relay circuit means comprises second relay means operative in a first condition to couple said first speed error signals to said output amplifier means, and operative in a second condition to couple said second speed error signals to said output amplifier means;

said relay circuit means being responsive to signals corresponding to fuze errors greater than a predetermined angle to place said relay in said first operative condition, and responsive to signals corresponding to fuze errors of less than said predetermined fuze angle to place said second relay in said second predetermined condition.

3. Apparatus as defined in claim 2, and:

said servo means comprises synchro units having stator elements having a plurality of electrical connections; and switching means responsive to retraction of said setter portions to effect reversal of some of said stator electrical connections whereby said pawls are displaced by a predetermined angular amount.

4. Apparatus as defined in claim 3, and wherein:

said relay circuit means comprises circuitry responsive to fuze error signals corresponding to less than a second predetermined fuze angle to generate a "fuze set" signal; and solenoid valve means connected to control pressure fluid flow to said valve body and responsive to predetermined conditions including said "fuze set" signal to initiate retraction of said fuze setter portion.

5. Apparatus as defined in claim 4, and comprising:

cam means mounted in said housing for rotation with one of said synchro elements; and switch means cooperable with said cam to prevent generation of said fuze set signal when a fuze engaged by said pawls is set for a fuze time less than a predetermined minimum fuze time.

References Cited
UNITED STATES PATENTS

| | | | |
|---|---|---|---|
| 2,444,813 | 7/1948 | Cunningham | 89—6 |
| 2,792,759 | 5/1957 | Campbell | 89—6 |

SAMUEL W. ENGLE, Primary Examiner